United States Patent
Slattery et al.

(10) Patent No.: US 8,160,499 B2
(45) Date of Patent: *Apr. 17, 2012

(54) REDUCING EXPOSURE OF RADIO DEVICES TO INTERFERENCE THROUGH ADAPTIVE SELECTION OF REPETITIVE SYMBOLS

(75) Inventors: Kevin P. Slattery, Hillsboro, OR (US); Alan E. Waltho, San Jose, CA (US); Michael Schaffer, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,633

(22) Filed: Feb. 22, 2011

(65) Prior Publication Data

US 2011/0141125 A1  Jun. 16, 2011

Related U.S. Application Data

(63) Continuation of application No. 11/864,892, filed on Sep. 28, 2007, now Pat. No. 7,894,773.

(51) Int. Cl.
*H04B 1/00* (2006.01)

(52) U.S. Cl. .. 455/63.1; 455/62; 455/114.2; 340/538.12

(58) Field of Classification Search ............... 455/63.1, 455/62, 114.2, 278.1, 296; 340/538.12; 375/254, 375/296

See application file for complete search history.

(56) References Cited

U.S. PATENT DOCUMENTS

| | | | | |
|---|---|---|---|---|
| 3,680,122 A * | 7/1972 | Graham et al. | | 342/455 |
| 3,835,424 A * | 9/1974 | Marik | | 334/87 |
| 4,114,101 A * | 9/1978 | Sekiguchi | | 455/158.3 |
| 4,198,601 A * | 4/1980 | Ono et al. | | 455/73 |
| 4,284,989 A * | 8/1981 | Parsons | | 345/26 |
| 4,562,595 A * | 12/1985 | Bauer et al. | | 455/345 |
| 4,896,370 A * | 1/1990 | Kasparian et al. | | 455/77 |
| 5,771,002 A * | 6/1998 | Creek et al. | | 340/539.21 |
| 7,440,778 B2 * | 10/2008 | Pearce | | 455/565 |
| 7,567,174 B2 * | 7/2009 | Woodard et al. | | 340/539.26 |
| 7,894,773 B2 * | 2/2011 | Slattery et al. | | 455/63.1 |
| 2005/0261847 A1 * | 11/2005 | Nara | | 702/76 |
| 2006/0055534 A1 * | 3/2006 | Fergusson | | 340/562 |
| 2006/0265195 A1 * | 11/2006 | Woodard et al. | | 702/188 |
| 2007/0224940 A1 * | 9/2007 | Pankinaho et al. | | 455/62 |
| 2008/0146204 A1 * | 6/2008 | Gu et al. | | 455/414.1 |
| 2009/0011752 A1 * | 1/2009 | Pearce | | 455/418 |
| 2009/0289936 A1 * | 11/2009 | Sheedy et al. | | 345/214 |
| 2009/0296584 A1 * | 12/2009 | Bernard et al. | | 370/241 |

* cited by examiner

*Primary Examiner* — Minh D Dao

(74) *Attorney, Agent, or Firm* — Caven & Aghevli LLC

(57) ABSTRACT

Methods and apparatus relating to reducing exposure of radio devices to interference through adaptive selection of repetitive symbols are described. In an embodiment, a symbol may be selected for transmission to a display based on the operating frequency of a wireless device receiver. Other embodiments are also described and claimed.

20 Claims, 4 Drawing Sheets

REDUCING EXPOSURE OF RADIO DEVICES TO INTERFERENCE THROUGH ADAPTIVE SELECTION OF REPETITIVE SYMBOLS

RELATED APPLICATIONS

This application claims priority from and is a continuation of U.S. patent application Ser. No. 11/864,892, entitled "REDUCING EXPOSURE OF RADIO DEVICES TO INTERFERENCE THROUGH ADAPTIVE SELECTION OF REPETITIVE SYMBOLS," filed Sep. 28, 2007, issued as U.S. Pat. No. 7,894,773, on Feb. 22, 2011, which is hereby incorporated by reference for all purposes.

FIELD

The present disclosure generally relates to the field of electronics. More particularly, an embodiment of the invention relates to reducing exposure of radio devices to interference through adaptive selection of repetitive symbols.

BACKGROUND

Data streams for digital displays may incorporate a number of signals to control synchronization of a display. These signals may be in the form of specifically coded symbols. During transmission, these symbols may generate electromagnetic interference (EMI). As computing devices shrink in size, the EMI emissions produced by a display data stream may have a growing impact.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may be utilized to reduce potential interference to communication systems (e.g., wireless components such as PAN (Personal Area Network), WLAN (Wireless LAN (Local Area Network)), WWAN (Wireless Wide Area Network), GPS (Global Positioning System), Mobile TV (Television), or other wireless receivers) that may be connected to one or more radio frequency (RF) antennas in close proximity to the display or display drivers. In an embodiment, adaptive selection of control and timing display symbols with an appropriately shaped spectrum may mitigate potential interference (such as EMI) to communication systems located in close proximity to the display or display drivers. In one embodiment, one or more control symbols embedded in a display driver may be adaptively modified in accordance with a real time frequency of radio systems operating within a mobile platform, e.g., such that a level of interference to which the radio would normally be exposed is reduced. Such techniques may reduce the constraints on antenna placement and/or shielding that would otherwise need to be imposed.

Figure 1:
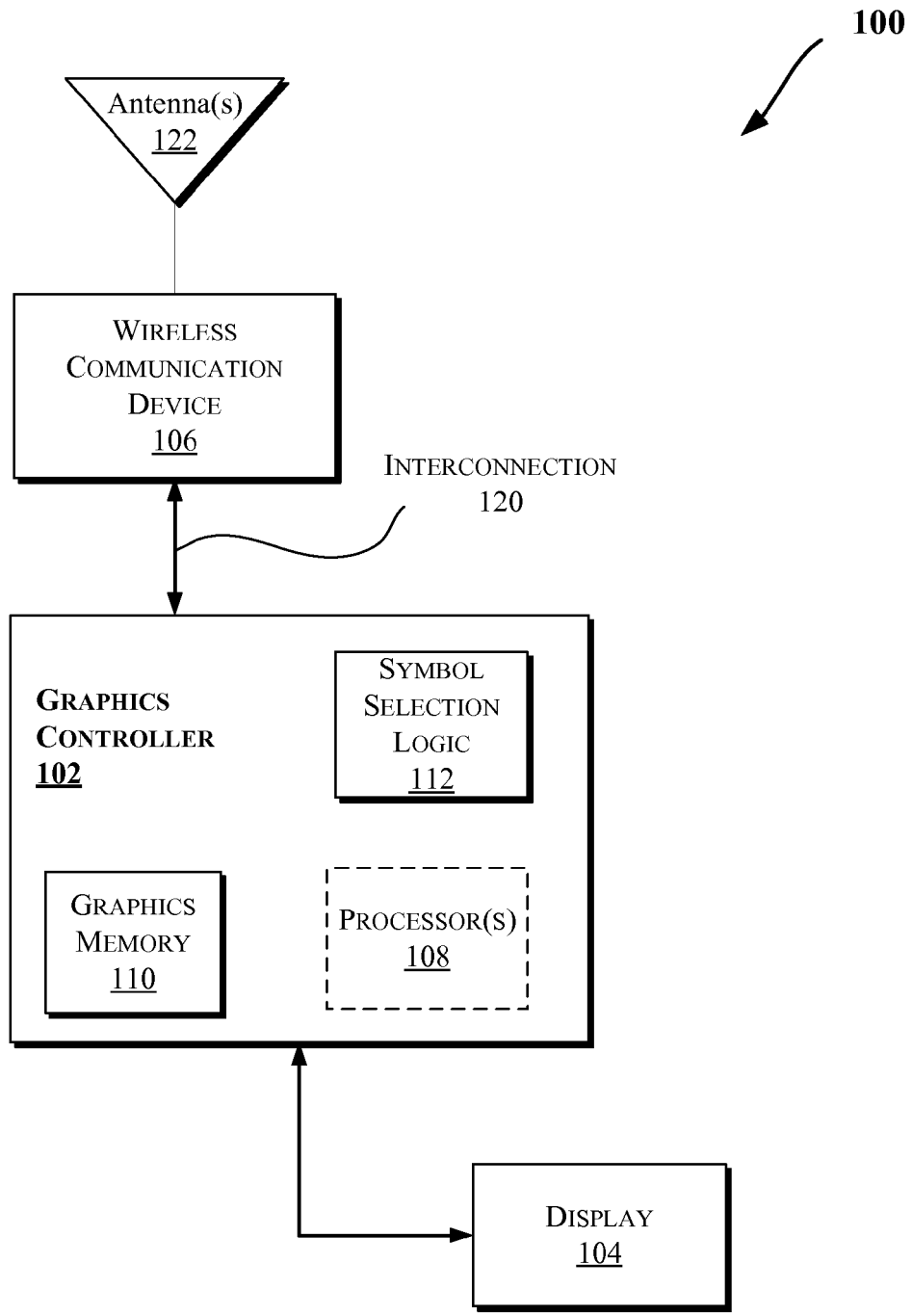
FIGS. 1, 2, and 4 illustrate block diagrams of embodiments of systems, which may be utilized to implement various embodiments discussed herein.

FIG. 1 illustrates a block diagram of a computing system 100 in accordance with an embodiment of the invention. The computing system 100 may include a graphics controller 102, a display 104 (e.g., to display image data generated by the graphics controller 102), and a wireless communication device 104.

Figure 2:
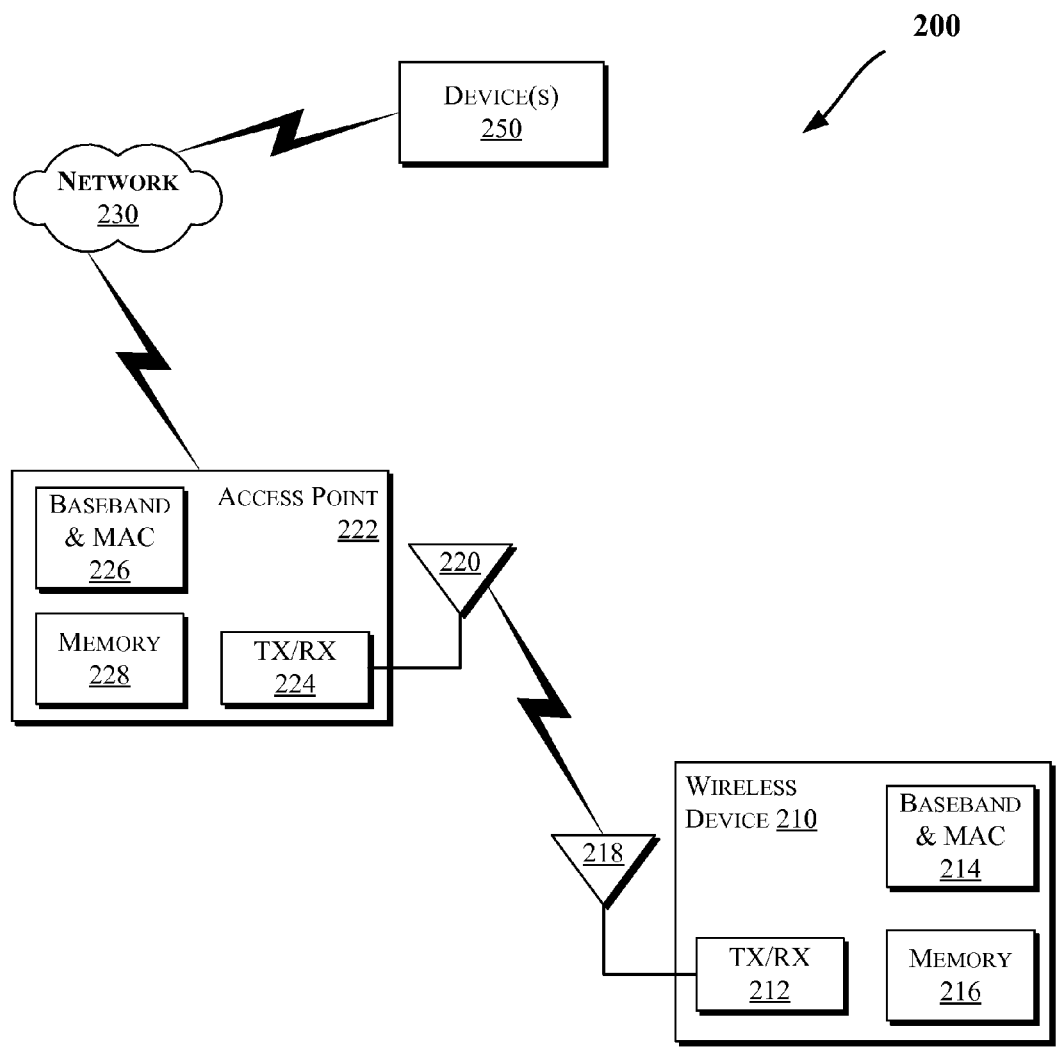
Figure 3:
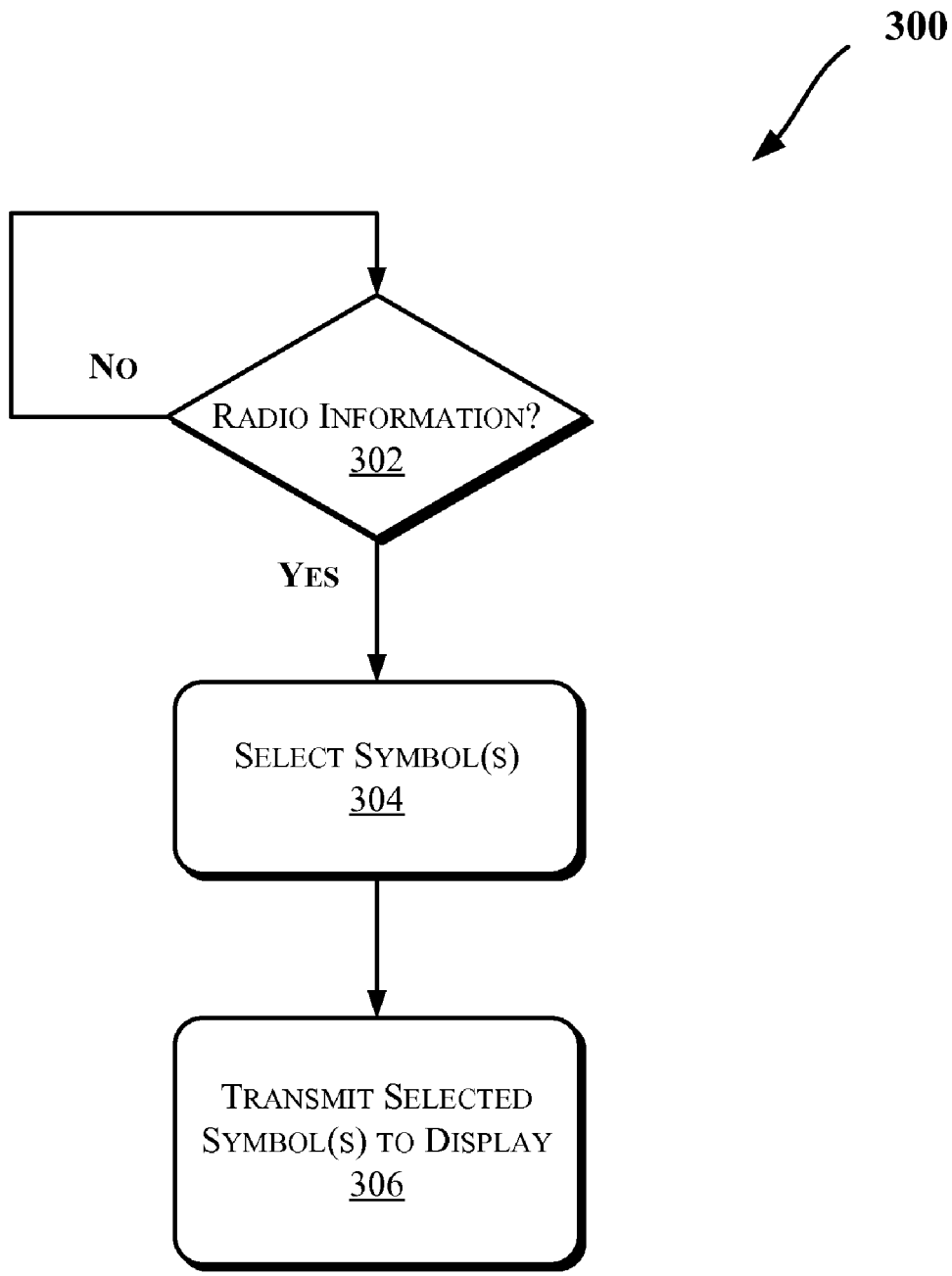
FIG. 3 illustrates a flow diagram of a method in accordance with an embodiment of the invention.
Figure 4:
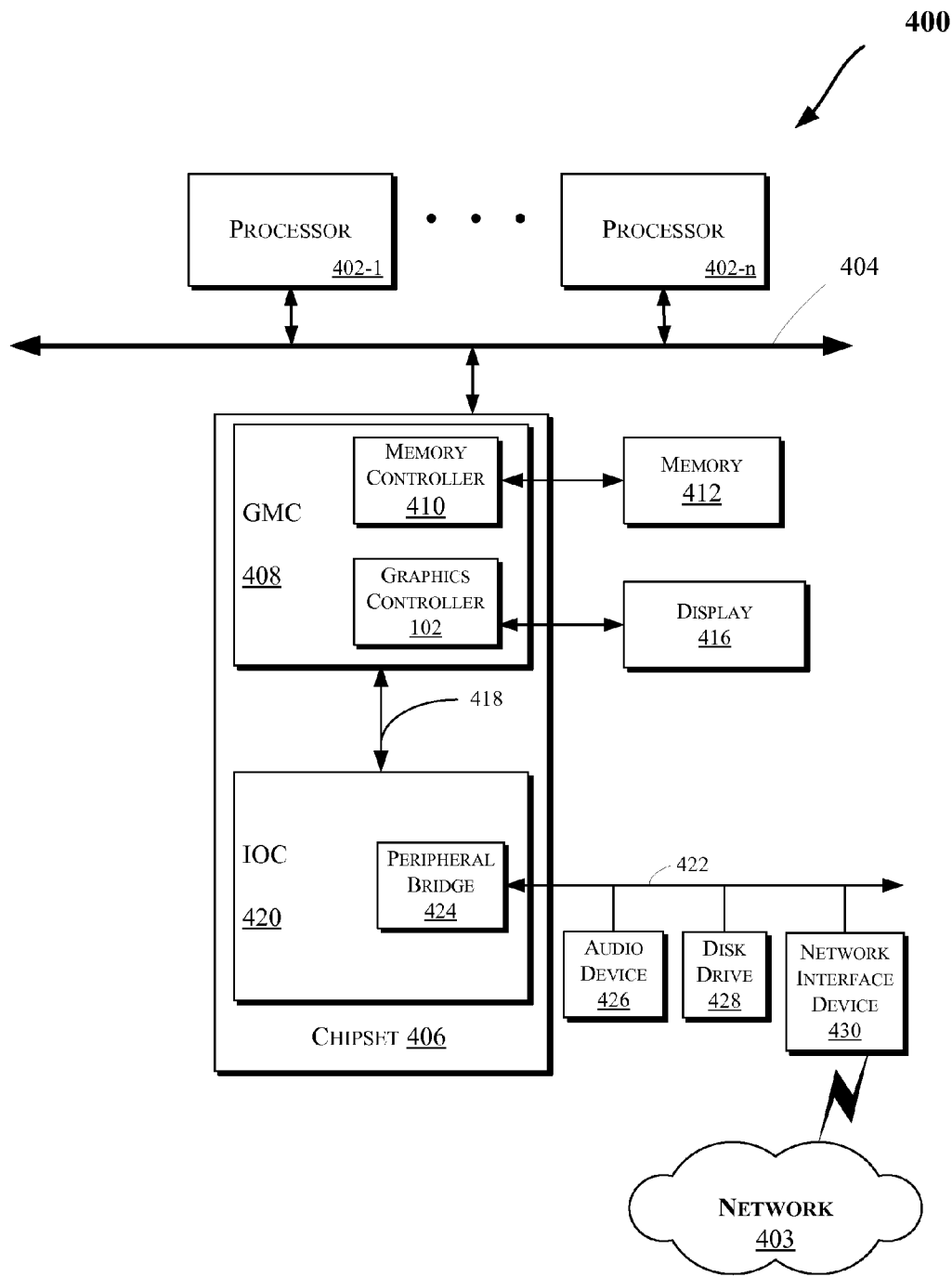

As shown in FIG. 1, the graphics controller 102 may include one or more processors 108 (which may be optional in some embodiments as will be further discussed herein, e.g., with reference to FIGS. 2-4), a graphics memory 110, and/or a symbol selection logic 112. An interconnection 120 may couple the wireless communication device 106 and the graphics controller 102. As will be further discussed herein, e.g., with reference to FIG. 2, the wireless communication device 106 may be coupled to one or more antennas 122.

In one embodiment, the graphics controller 102 may be provided on an integrated circuit (IC) device. In some embodiments, the IC device may be coupled to a motherboard of a computing device (such as a desktop computer, a portable computer, a personal digital assistance, a smart phone, etc.), for example, through a socket (such as a zero insertion force (ZIF) socket) and/or a soldered connection. In an embodiment, the memory 110 may be accessible by other components of a computing system (such as one or more processor cores discussed with reference to FIG. 4). Moreover, the memory 110 may include bulk dynamic random access memory (DRAM) chips or units, which may simultaneously support two separate channels of double data rate (DDR) DRAM devices. Alternatively, additional channels of memory may be utilized to improve performance.

As discussed herein, the usage of "bus," "interconnection," or "interconnection network" may be interchangeable. Moreover, the interconnection 120 may communicate via various communication protocols such peripheral component interconnect (PCI) (e.g., which may comply with PCI Local Bus Specification, Revision 3.0, March 2004), PCI-X (e.g., which may comply with PCI-X Specification Rev. 2.0a, April 2003), or PCI express (PCIe) (e.g., which may operate in accordance with PCIe Specification, Revision 2.0, October 2006). Also, the graphics controller 102 may communicate with the display 104 through various communication media, including for example, an analog or digital wired connection.

Additionally, the graphics controller 102 may have access to one or more graphics memory unit(s), such as one or more units of DDR, graphics DDR (GDDR), DRAM, etc. In some embodiments, the memory units utilized may be faster (e.g., operating at a higher frequency), include less capacity, and/or provide a wider data path access when compared with the memory units used for a system memory (such as the memory 412 of FIG. 4). Also, the memory devices discussed herein may include various types of memory units in various embodiments, such as dual in-line memory modules (DIMMs) or small outline DIMMs (SO-DIMMs).

Referring to FIG. 2, a block diagram of a wireless local area or cellular network communication system 200 in accordance with one or more embodiments of the invention will be discussed. In the communication system 200 shown in FIG. 2, a wireless device 210 may include a wireless transceiver or receiver 212 to couple to an antenna 218 and to a logic 214 such as a processor (e.g., to provide baseband and media access control (MAC) processing functions). In some embodiment, the wireless communication device 106 of FIG. 1 may include one or more of the components discussed with reference to the wireless device 210. In one embodiment of the invention, wireless device 210 may be a cellular telephone or an information handling system such as a mobile personal computer or a personal digital assistant or the like that incorporates a cellular telephone communication module. Logic 214 in one embodiment may comprise a single processor, or alternatively may comprise a baseband processor and an applications processor. Logic 214 may couple to a memory 216 which may include volatile memory such as dynamic random-access memory (DRAM), non-volatile memory such as flash memory, or alternatively may include other types of storage such as a hard disk drive. Some portion or all of memory 216 may be included on the same integrated circuit as logic 214, or alternatively some portion or all of memory 216 may be disposed on an integrated circuit or other medium, for example a hard disk drive, that is external to the integrated circuit of logic 214.

Wireless device 210 may communicate with access point 222 via a wireless communication link, where access point 222 may include one or more of: an antenna 220, a transceiver 224, a processor 226, and a memory 228. In one embodiment, access point 222 may be a base station of a cellular telephone network, and in another embodiment, access point 222 may be a an access point or wireless router of a wireless local or personal area network. In an embodiment, access point 222 (and optionally wireless device 210) may include two or more antennas, for example to provide a spatial division multiple access (SDMA) system or a multiple input, multiple output (MIMO) system. Access point 222 may couple with network 230 (which may be the same or similar to the network 403 of FIG. 4 in some embodiments) so that wireless device 210 may communicate with network 230, including devices coupled to network 230 (e.g., one or more of the devices 250), by communicating with access point 222 via a wireless communication link. Network 230 may include a public network such as a telephone network or the Internet, or alternatively network 230 may include a private network such as an intranet, or a combination of a public and a private network. Communication between wireless device 210 and access point 222 may be implemented via a wireless local area network (WLAN). In one embodiment, communication between wireless device 210 and access point 222 may be at least partially implemented via a cellular communication network compliant with a Third Generation Partnership Project (3GPP or 3G) standard. In some embodiments, antennas 218 and/or 220 (which may be the same or similar to the antenna(s) 122 of FIG. 1) may be utilized in a wireless sensor network, a mesh network, a GPS receiver, and/or a Mobile TV receiver.

FIG. 3 illustrates a flow diagram of a method 300 to adaptively select repetitive symbols, according to an embodiment of the invention. In some embodiments, various components discussed with reference to FIGS. 1-2 and 4 may be utilized to perform one or more of the operations discussed with reference to FIG. 3.

Referring to FIGS. 1-3, at an operation 302, it is determined whether radio information (such as radio bands and/or frequencies) is available. For example, the wireless communication device 106 may indicate at operation 302 the radio frequency used for one or more of its antenna(s) 122 to the graphics controller 102 (e.g., the processor(s) 108 in an embodiment). In one embodiment, the wireless transceiver or receiver 212 may indicate the radio frequency of its antenna 218 (e.g., via the logic 214 in an embodiment) to the graphics controller 102 (e.g., the processor(s) 108 in an embodiment) at operation 302.

At an operation 304, one or more symbols may be selected based on the information provided at operation 302. For example, the symbol selection logic 112 may select the symbol(s) based on the radio information of operation 302 by accessing a storage device (such as the memory 110 and/or 412). Accordingly, the memory device may store information relating to which symbols are to be selected for the radio information provided at operation 302. The selected symbol(s) of operation 304 may be transmitted (e.g., by the graphics controller 102) to a display device (such as the display 104).

In some embodiments, the graphics memory 110 (and/or the memory 412) may store various data regarding symbols that are to be selected by the logic 112 based on the radio information. For example, a given symbol set may be ordered with regard to their radiated emissions impact (e.g., such as shown in Table 2 below). This may be done by first determining the pixel clock frequency (which may be the frequency used by, for example, the graphics controller 102 to transmit pixel data to the display 104) and the frequency at which a radio (e.g., such as the wireless devices discussed with reference to FIGS. 1-2) installed in the mobile computing device (e.g., a personal digital assistance, a laptop computer, a smart phone, etc.) is operating. From this the critical harmonic ratios of the pixel clock that fall into the band of the radio receiver are determined. Using these harmonic ratios, the inner product of the Fourier components applicable to each of the candidate symbols at the harmonic frequencies of interest are calculated and ranked. The set of the Fourier components may be viewed as a vector in complex space $C^n$, where n is the number of harmonics determining the dimension of the complex space. The inner product may then be determined (e.g., by a logic such as the processor(s) 108, 402, and/or logic 214) as follows:

$$\|(v_1, v_2, v_3 \ldots v_n)\| = |\sqrt{(v_1, v_2, v_3 \ldots v_n) \cdot (v_1, v_2, v_3 \ldots v_n)}|$$

where $$v_1 = (a_1 \pm jb_1),$$

$$v_2 = (a_2 \pm jb_2)$$

a and b are the harmonic Fourier components of the symbol

The inner product may be chosen because it is conceptually easy to appreciate, and it is an invariant of any given vector. It is also a real number and therefore the set of the inner products for the set of symbols may be ordered and ranked. The symbols with the lowest rank may then be adaptively selected as control signals for the display driver (e.g., the graphics controller 102) such as discussed with reference to method 300. The techniques discussed herein may also be used to analyze the impact of sequences of symbols. In one embodiment, a subset of symbols out of a given symbol set may be used for highly repetitive sequences such as blanking symbols to produce emissions that may be lower (e.g., by up to 10 dB in some implementations).

Table 1 below lists sample symbols (illustrated as q_out values having 10 bits each) which may be used for HDMI (High Definition Multimedia Interface) encoding in some embodiments. As shown, the symbols may include two and three event patterns (illustrated in columns D0-D3), where an event may be defined as the presence of a "1".

TABLE 1

10 bit display frame TERC4 symbols

| D3 | D2 | D1 | D0 | q_out[9:0] |
|---|---|---|---|---|
| 0 | 0 | 0 | 0 | 0b10 1001 1100 |
| 0 | 0 | 0 | 1 | 0b10 0110 0011 |
| 0 | 0 | 1 | 0 | 0b10 1110 0100 |
| 0 | 0 | 1 | 1 | 0b10 1110 0010 |
| 0 | 1 | 0 | 0 | 0b01 0111 0001 |
| 0 | 1 | 0 | 1 | 0b01 0001 1110 |
| 0 | 1 | 1 | 0 | 0b01 1000 1110 |
| 0 | 1 | 1 | 1 | 0b01 0011 1100 |
| 1 | 0 | 0 | 0 | 0b10 1100 1100 |
| 1 | 0 | 0 | 1 | 0b01 0011 1001 |
| 1 | 0 | 1 | 0 | 0b011001 1100 |
| 1 | 0 | 1 | 1 | 0b10 1100 0110 |
| 1 | 1 | 0 | 0 | 0b10 1000 1110 |
| 1 | 1 | 0 | 1 | 0b10 0111 0001 |
| 1 | 1 | 1 | 0 | 0b01 0110 0011 |
| 1 | 1 | 1 | 1 | 0b10 1100 0011 |

Table 2 below shows sample ordering of the TERC4 (Transition Minimized Differential Signaling (TMDS) Error Reduction Coding-4 bit) symbol list using the inner product function that may be used in some embodiments. In this first ordering, comparing the single-ended spectrum (e.g., as it would be seen at the input to a spectrum analyzer), the clock symbol is seen to have the highest inner product and a single bit symbol, representing a 10% duty cycle signal has the lowest. In one embodiment, the data discussed with reference to Tables 1 and/or 2 may be stored in the graphics memory 110 and/or memory 412 such that the symbol selection logic 112 may access the data.

TABLE 2

Ordered symbol set according to Inner Product

| Symbol | inner-product symbol |
|---|---|
| t1011100010 | 0.49 |
| t0110001110 | 0.418 |
| t1001110001 | 0.418 |
| t1011001100 | 0.383 |
| t1001100011 | 0.376 |
| t0110011100 | 0.376 |
| t0100111001 | 0.347 |
| t1011000110 | 0.347 |
| t0101110001 | 0.307 |
| t1010001110 | 0.307 |
| 80percent | 0.303 |
| t1011100100 | 0.269 |
| t0100111100 | 0.24 |
| t1011000011 | 0.24 |
| t100011110 | 0.237 |
| t1010011100 | 0.225 |
| t0101100011 | 0.225 |
| single bit | 0.2 |

FIG. 4 illustrates a block diagram of a computing system 400 in accordance with an embodiment of the invention. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Further, the operations discussed with reference to FIGS. 1-3 may be performed by one or more components of the system 400.

A chipset 406 may also communicate with the interconnection network 404. The chipset 406 may include a graphics memory controller (GMC) 408. The GMC 408 may include a memory controller 410 that communicates with a main system memory 412. The memory 412 may store data, including sequences of instructions, which may be executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMC 408 may also include the graphics logic 104 that communicates with a display device 416. In one embodiment of the invention, the graphics controller 102 may communicate with the display device 416 (which may be the same or similar to the display 104 of FIG. 1) via an accelerated graphics port (AGP) and/or a PEG port. In an embodiment of the invention, the display 416 (such as a flat panel display) may communicate with the controller 102 through, for example, a signal converter (not shown) that translates a digital representation of an image stored in a storage device such as video memory or system memory (e.g., memory 412) into display signals that are interpreted and displayed by the display 416. Moreover, in some embodiments that utilize a PEG (PCI Express Graphics) port, one or more of the PEG port pins may be used to drive the display device 416. The display signals produced by the display device may pass through various devices before being interpreted by and subsequently displayed on the display 416.

An interface 418 may allow the GMC 408 and an input/output controller (IOC) 420 to communicate. The IOC 420 may provide an interface to I/O device(s) that communicate with the computing system 400. The IOC 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the IOC 420, e.g., through multiple bridges or controllers. Moreover, other peripherals in communication with the IOC 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). In some embodiments, the device 430 may be a wireless device such as devices 106, 210, etc. discussed with reference to FIGS. 1-3. Other devices may communicate via the bus 422. Also, various components (such as the network interface device 430) may communicate with the GMC 408 in some embodiments of the invention. In addition, the processor 402 and the GMC 408 may be combined to form a single chip. Furthermore, a graphics accelerator may be included within the GMC 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration. For example, processors, memory, and/ or input/output devices may be interconnected by a number of point-to-point interfaces.

In various embodiments of the invention, the operations discussed herein, e.g., with reference to FIGS. 1-4, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-4.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment. Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A system comprising:
    a wireless device having an antenna and a first logic to determine an operating frequency of a wireless receiver coupled to the antenna;
    a memory to store a plurality of symbols corresponding to a plurality of operating frequency values of the wireless receiver; and
    a graphics controller to select a symbol from the plurality of the stored symbols in response to the determined operating frequency of the wireless receiver, wherein the selected symbol is a symbol with a lowest rank for the determined operating frequency relative to the remaining ones of the plurality of stored symbols in the memory.

2. The system of claim 1, wherein the symbol comprises one or more of control or timing display symbols.

3. The system of claim 1, wherein the memory stores a set of inner product of Fourier components applicable to each of the plurality of symbols at a plurality of select harmonic frequencies, wherein the selected symbol corresponds to a lowest ranked symbol stored in the memory for the determined operating frequency.

4. The system of claim 1, wherein the selected symbol is to cause a least amount of electromagnetic interference with in a band of the determined operating frequency.

5. The system of claim 1, wherein the graphics controller comprises the memory and a second logic to select the symbol from the memory.

6. The system of claim 1, wherein the memory comprises a system memory shared between the graphics controller and one or more processors.

7. The system of claim 6, wherein at least one of the one or more processors comprises a plurality of processor cores.

8. The system of claim 1, wherein the wireless device comprises a plurality of antennas.

9. The system of claim 1, wherein the first logic comprises a processor.

10. A method comprising:
    determining an operating frequency of a wireless receiver of a wireless device;
    storing a plurality of symbols corresponding to a plurality of operating frequency values of the wireless receiver;
    selecting a symbol from the plurality of the stored symbols in response to the determined operating frequency of the wireless receiver; and
    storing a set of inner product of Fourier components applicable to each of the plurality of symbols at a plurality of select harmonic frequencies, wherein the selected symbol corresponds to a lowest ranked symbol stored in a memory for the determined operating frequency.

11. The method of claim 10, wherein the symbol comprises one or more of control or timing display symbols.

12. The method of claim 10, further comprising one or more instructions that configure the processor to cause the selected to be transmitted to a display.

13. The method of claim 10, wherein the processor comprises a plurality of processor cores.

14. A system comprising:
- a wireless device having an antenna and a first logic to determine an operating frequency of a wireless receiver coupled to the antenna;
- a memory to store a plurality of symbols corresponding to a plurality of operating frequency values of the wireless receiver; and
- a graphics controller to select a symbol from the plurality of the stored symbols in response to the determined operating frequency of the wireless receiver, wherein the memory stores a set of inner product of Fourier components applicable to each of the plurality of symbols at a plurality of select harmonic frequencies, wherein the selected symbol corresponds to a lowest ranked symbol stored in the memory for the determined operating frequency.

15. The system of claim 14, wherein the symbol comprises one or more of control or timing display symbols.

16. The system of claim 14, wherein the selected symbol is to cause a least amount of electromagnetic interference within a band of the determined operating frequency.

17. The system of claim 14, wherein the graphics controller comprises the memory and a second logic to select the symbol from the memory.

18. The system of claim 14, wherein the memory comprises a system memory shared between the graphics controller and one or more processors.

19. The system of claim 18, wherein at least one of the one or more processors comprises a plurality of processor cores.

20. The system of claim 14, wherein the selected symbol is a symbol with a lowest rank for the determined operating frequency relative to the remaining ones of the plurality of stored symbols in the memory.

* * * * *